Dec. 3, 1946.   L. J. HARRISS   2,411,857
METHOD AND APPARATUS FOR MAKING PIES
Filed July 6, 1942
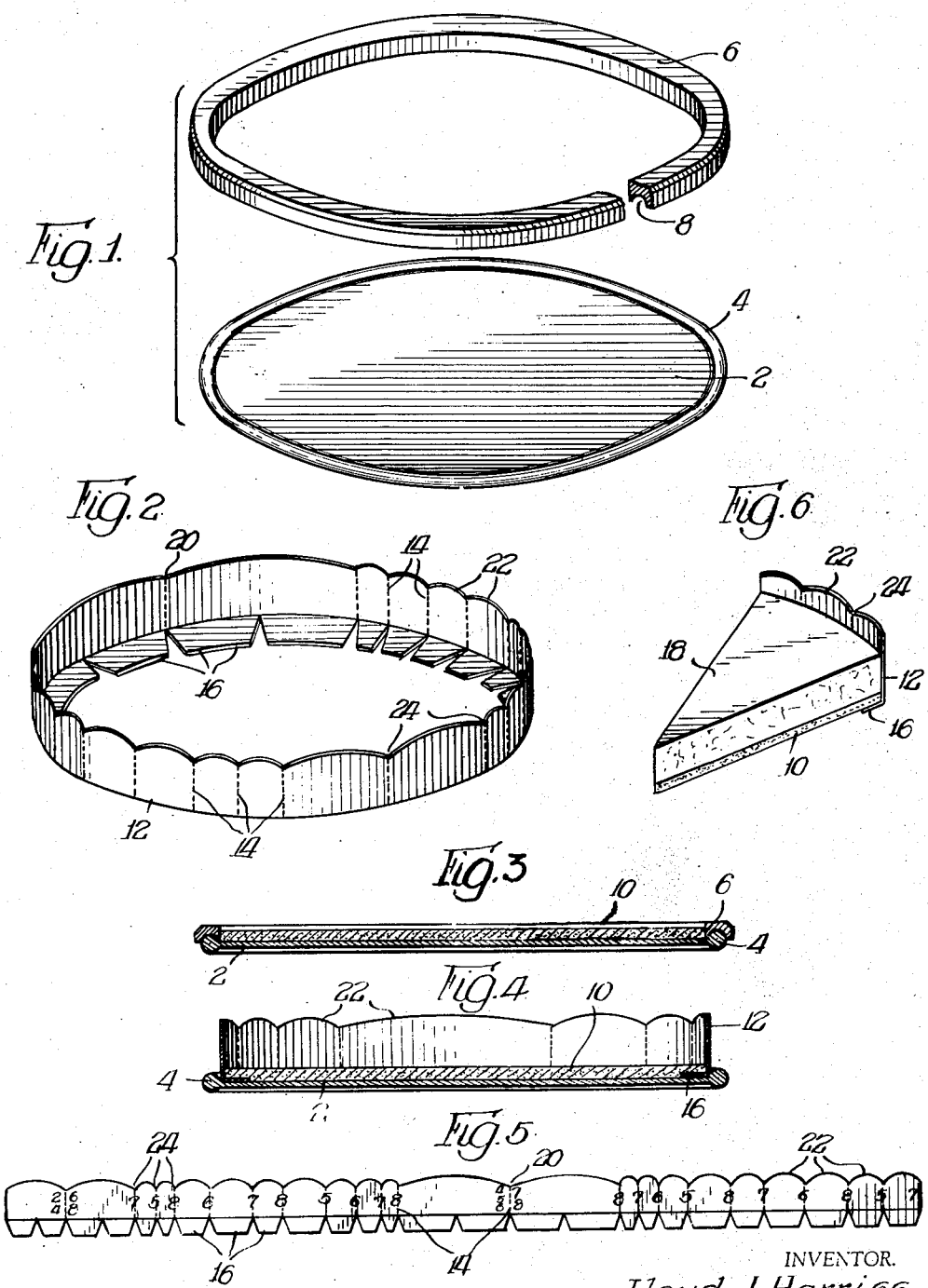
INVENTOR.
Lloyd J. Harriss,
BY
Spencer, Margell, Johnston & Cook.
Attys.

Patented Dec. 3, 1946

2,411,857

UNITED STATES PATENT OFFICE 2,411,857

METHOD AND APPARATUS FOR MAKING PIES

Lloyd J. Harriss, Kenilworth, Ill.

Application July 6, 1942, Serial No. 449,866

9 Claims. (Cl. 107—54)

This invention relates in general to a method and apparatus for making pastries and more particularly to novel means used in the method of making so-called open pies which have no top crust.

One of the objects of this invention is the provision of a new and improved baking utensil for carrying out the method of making an open pie.

Another object of the invention is to provide a baking utensil for making the bottom crust of the pie, which utensil is formed of readily separable parts to facilitate the carrying out of the various steps.

Still another object of the invention is to provide novel measuring means adapted to surround the pie for indicating the proper places for cutting the pie into a predetermined number of equal portions.

A further object of the invention is to provide a flexible band for surrounding the pie, which band not only bears indicia for properly proportioning the cuts of pie but also acts as a retaining means to prevent the pie filling from flowing beyond the edges thereof.

A still further and more specific object of the invention is to provide a novel baking utensil which has a removable rim thereon, said rim capable of being replaced by a measuring band after the bottom crust has been baked.

Other objects and advantages of the invention will be apparent by reference to the following description in conjunction with the following drawing in which Fig. 1 is a perspective view of the utensil for baking the crust showing the two parts thereof separated;

Fig. 2 is a perspective view of the circular measuring band;

Fig. 3 is a vertical section through the assembled baking utensil showing the bottom crust therein;

Fig. 4 is a vertical section through the baking utensil wherein the removable rim has been replaced by the measuring band;

Fig. 5 is a developed view of the measuring band; and

Fig. 6 is a perspective view of a single cut of the pie.

Referring now more particularly to the drawing, the baking utensil which I have designed for use in carrying out the method of my invention includes a bottom plate or disk 2 provided at its peripheral edge with an annular bead 4. It will be obvious that this bead or rib can assume any desired configuration. However, for purposes of illustration I have chosen to show this bead as having a substantially circular cross section. It is desirable that this bead extend upwardly beyond the upper surface of the plate 2 to prevent any lateral sliding movement of the pie resting thereon.

A rim in the form of a ring 6 is provided on its under side with an annular groove 8. This groove has a configuration substantially complementary to the upper half of the bead 4, in this case semi-circular, so that it may fit snugly thereon.

Fig. 3 shows the utensil in assembled position, the ring 6 forming a rim within the confines of which the lower crust 10 is formed. While the lower crust may be formed of any suitable material customarily used in making pies, in actual practice I have made the crust of a graham cracker dough, the dough being placed on the plate 2 and manipulated so as to substantially fill the space within the ring 6. After the dough has thus been located in the utensil it is placed in an oven and properly baked.

After the bottom crust has been baked and the utensil removed from the oven the ring 6 is removed from the plate. The bottom crust 10 is also then removed temporarily and a measuring band 12 is placed on the plate 2. This band, which is preferably formed of a flexible material such as paper or the like, has a circumference which is substantially equal to the circumference of the plate 2 within the bead 4 and is provided throughout its length with a plurality of circumferentially spaced apart axially extending perforated lines 14. The bottom edge of the band 12 has a number of inwardly extending tapered tongues 16. After the band is properly located on the plate, the crust 10 is then replaced and rests on the tongues 16. After this step, any suitable filling 18 is placed on the crust and within the confines of the band 12. It will therefore be seen that thus far in the making of the pie the measuring band serves in the manner of a side crust and acts to retain the filling and prevent its overflowing.

Any suitable filling may be used. However, it is desirable that it be of a consistency similar to custards, thick creams, or other substances which will take a "set" and which will not have a tendency to run after cutting.

It will be noted upon reference to Fig. 5 that each one of the perforated lines 14 along the length of the band 12 is identified by a number or numbers. In the example shown, these numbers range from 2 to 8, but it will be obvious that any additional numbers may be used if desired. These identifying numbers indicate the proper places to cut the pie in order to divide it into a predetermined number of equal portions. It is advisable in each case to have a common starting point and in Fig. 5 this is indicated by the numeral 20. Starting from this point then, supposing it is desired to cut the pie into eight equal portions. After the initial cut is made other cuts will be made around the pie wherever the numeral 8 occurs, thereby dividing the pie and the measuring band into eight equal portions. Likewise, if seven equal portions are desired a cut will be made on each perforated line indicated by the numeral 7 after the initial cut has been made along the line indicated at 20. A similar procedure will be followed in dividing the pie into any other number of equal parts. When it is to be divided into less than five equal portions, for example four or three, after the initial cut is made along the line 20, every other line indicated by the numeral 8 or every other line indicated by the numeral 6 will be cut.

This method of baking the bottom crust and completing the pie to the point where the filling is placed within the measuring band will be performed at the bakery. The pie will then be shipped out in this condition. The cutting of the pie will not take place until just prior to serving, at which time the portion of the band remaining around the edge of the pie may be easily removed.

Some of the advantages arising out of this apparatus and method will be obvious. For example, restaurants will have less bulky pie plates to return to the bakery and it will not be necessary to divide the pie by the use of any additional means because the measuring band, being formed of a flexible material such as paper or the like, may be readily cut at the desired points and then thrown away.

While the upper edge of the indicating band 12 may obviously be smooth if desired, I have preferred to provide a scalloped edge thereon with raised portions such as at 22 which terminate in indentations 24 at each of the perforated lines so that a person cutting the pie can easily locate the exact position of the perforated line along which he desires to cut.

Having thus described the invention, what I claim as new and desire to secure by Letters Patent of the United States is:

1. A baking utensil for use in making a pastry crust comprising, a substantially flat plate, and a thin ring member having an annular cut-out portion on its underside adapted to receive the peripheral edge of said plate, the dough for said crust resting on said plate within the confines of said ring, and said ring being readily removable from said plate after baking.

2. A baking utensil for use in making a pastry crust comprising, a substantially flat plate having a raised bead around the periphery thereof, and a ring member having an annular groove around the underside thereof adapted to receive said bead, the dough for said crust resting on said plate within the confines of said ring, and said ring being readily removable from said plate after baking.

3. A baking utensil for use in making a pastry crust comprising, a substantially flat plate having a raised bead around the periphery thereof, and a ring having an annular groove around the underside thereof of a configuration complementary to said bead, whereby said groove will snugly receive said bead when the plate and ring are assembled, the dough for said crust resting on said plate within said ring, and said ring being readily removable from said plate after baking.

4. The method of making pastries which comprises the steps of, baking a substantially flat bottom crust, placing a flexible measuring band around said crust, and depositing a filling within the area provided by the crust and band.

5. The method of making pastries which comprises the steps of, placing a pie crust dough onto a plate having a removable rim thereon, baking said dough to provide a substantially flat bottom crust, replacing said rim with a measuring band, and depositing a filling within the area provided by said crust and band.

6. The method of making pastries which comprises the steps of, placing a pie crust dough onto a plate, baking said dough to provide a substantially flat bottom crust, removing said crust from the plate, placing on said plate a measuring band having inwardly extending tongues on the lower edge thereof, replacing said crust on said plate so as to rest on said tongues, and depositing a filling within the area provided by said crust and band.

7. The method of making a pie which comprises placing an unbaked pie dough upon a substantially flat baking utensil having a raised peripheral edge with a removable rim covering said edge whereby said pie dough when baked will be contained within said utensil by the inside of said rim, baking said pie dough, thereafter removing said rim, placing a vertically disposed flexible band around the periphery of said baked pie dough inside the raised peripheral edge of said utensil, said flexible band being of sufficient width to provide a side enclosure for the space above said baked pie dough, and depositing an edible filling in said space within the confines of said dough and said band.

8. A method as claimed in claim 7 in which said flexible band is provided with an inturned bottom flange which is placed intermediately between the bottom of said baked pie dough and the upper surface of said utensil.

9. The method of making a pie which comprises baking a pie dough upon a substantially flat surface while holding the edges to prevent lateral expansion during baking and to produce a substantially flat bottom crust of a predetermined configuration, then positioning a vertically disposed flexible band having flanged portions at the bottom thereof around the periphery of said baked pie dough with the flanged portions therebeneath, said flexible band being of sufficient width to provide a side enclosure for the space above said baked pie dough, holding said flexible band in place and depositing an edible filling in said space within the confines of said dough and said band.

LLOYD J. HARRISS.